(12) United States Patent
Chen et al.

(10) Patent No.: US 11,472,084 B2
(45) Date of Patent: *Oct. 18, 2022

(54) PREPARATION METHOD FOR THERMOPLASTIC POLYURETHANE MICRO AIR BAG ELASTOMER MATERIAL

(71) Applicant: NANTONG DE NEW MATERIAL CO., LTD., Jiangsu (CN)

(72) Inventors: Qiaojian Chen, Shanghai (CN); Yanglong Guo, Shanghai (CN)

(73) Assignee: NANTONG DE NEW MATERIAL CO., LTD., Jiangsu (CN)

( * ) Notice: Subject to any disclaimer, the term of this patent is extended or adjusted under 35 U.S.C. 154(b) by 438 days.

This patent is subject to a terminal disclaimer.

(21) Appl. No.: 16/636,341

(22) PCT Filed: May 30, 2018

(86) PCT No.: PCT/CN2018/088921
§ 371 (c)(1),
(2) Date: Feb. 4, 2020

(87) PCT Pub. No.: WO2019/024589
PCT Pub. Date: Feb. 7, 2019

(65) Prior Publication Data
US 2020/0164560 A1     May 28, 2020

(30) Foreign Application Priority Data
Aug. 4, 2017 (CN) .......................... 201710660163.6

(51) Int. Cl.
*B29C 48/00* (2019.01)
*B29C 48/67* (2019.01)
(Continued)

(52) U.S. Cl.
CPC ........ *B29C 48/0012* (2019.02); *B29C 48/022* (2019.02); *B29C 48/345* (2019.02);
(Continued)

(58) Field of Classification Search
CPC .... B29B 9/065; B29C 48/0012; B29C 48/515
See application file for complete search history.

(56) References Cited

FOREIGN PATENT DOCUMENTS

| CN | 101370861 | 2/2009 |
|---|---|---|
| CN | 101925626 | 12/2010 |

(Continued)

OTHER PUBLICATIONS

"International Search Report (Form PCT/ISA/210) of PCT/CN2018/088921", dated Sep. 10, 2018, with English translation thereof, pp. 1-4.

*Primary Examiner* — James Sanders
(74) *Attorney, Agent, or Firm* — JCIP Global Inc.

(57) ABSTRACT

A method for preparing a thermoplastic polyurethane elastomer material with micro air holes is provided. The method comprises the following steps: (1) is feeding liquid raw materials such as diisocyanate molecules and solid additives into a double-screw reactor to trigger a polymerization type chain extension reaction and then obtain a macromolecular weight hot melt. (2) is pushing the macromolecular weight hot melt into a mixing extruder and allowing the reaction to continue to obtain a macromolecular thermoplastic polyurethane melt. (3) is continuously adding the obtained macromolecular thermoplastic polyurethane melt together with polymer particles into a foaming extruder, and extruding the high-pressure hot melt from a mold head into an underwater granulation chamber. (4) is delivering the particles obtained after granulation into a separator by process water via a (Continued)

multi-stage pressure-release process water pipeline, separating, screening and drying the required particles to obtain the target product.

10 Claims, 2 Drawing Sheets

(51) Int. Cl.
*B29C 48/345* (2019.01)
*B29C 48/515* (2019.01)
*C08G 18/48* (2006.01)
*C08G 18/76* (2006.01)
*B29B 9/06* (2006.01)
*B29K 75/00* (2006.01)
*B29K 105/04* (2006.01)

(52) U.S. Cl.
CPC ............ *B29C 48/515* (2019.02); *B29C 48/67* (2019.02); *C08G 18/4854* (2013.01); *C08G 18/7671* (2013.01); *B29B 9/065* (2013.01); *B29K 2075/00* (2013.01); *B29K 2105/041* (2013.01)

(56) References Cited

FOREIGN PATENT DOCUMENTS

| | | |
|---|---|---|
| CN | 103347942 | 10/2013 |
| CN | 104364304 | 2/2015 |
| CN | 106084744 | 11/2016 |
| CN | 106366286 | 2/2017 |
| CN | 106832887 | 6/2017 |
| CN | 107383854 | 11/2017 |

PREPARATION METHOD FOR THERMOPLASTIC POLYURETHANE MICRO AIR BAG ELASTOMER MATERIAL

CROSS-REFERENCE TO RELATED APPLICATION

This application is a 371 of international application of PCT application serial no. PCT/CN2018/088921, filed on May 30, 2018, which claims the priority benefit of China application no. 201710660163.6, filed on Aug. 4, 2017. The entirety of each of the above mentioned patent applications is hereby incorporated by reference herein and made a part of this specification.

TECHNICAL FIELD

The disclosure relates to the field of preparation of a thermoplastic polyurethane elastomer material, and in particular to a method for preparing a thermoplastic polyurethane elastomer material with micro air holes.

BACKGROUND

Thermoplastic polyurethane elastomer materials are widely applied in fields with high requirements for application environment or use, for example, automobiles, shoe materials, oil pipes, water pipes, cables and membranes. Thermoplastic polyurethane elastomer itself has excellent physical properties, resistance to acids and alkali, low-temperature elasticity and wear resistance, is transparent and easily colored, etc. Light consumables are becoming the key trend as social demands on environmental protection, increased energy use and decreased consumption increase. Actually foaming and expansion techniques are under development and started to be applied to reduce the weight of the thermoplastic polyurethane elastomer. However, the existing foaming and expansion processes have a long flow, various procedures, high energy consumption and a low yield, and in particular, due to limitations such as material degradation caused by various procedures, expanded thermoplastic polyurethane elastomer material is high in cost and price. Economic efficiency and material degradation are the main factors affecting the market application scope and development potentials of such expanded and foamed material.

Aimed at defects of the currently available expanded thermoplastic polyurethane elastomer such as material degradation caused by various procedures, high energy consumption and low yield, the disclosure combines thermoplastic polyurethane elastomer with micro air holes and a one-step polymerization reaction together to provide a process and a formula for directly preparing the expanded thermoplastic polyurethane elastomer with micro air holes using liquid raw materials.

SUMMARY

The objective of the disclosure is to provide a method for preparing a thermoplastic polyurethane elastomer material with micro air holes to overcome defects in prior art.

The objective of the disclosure can be achieved by the following technical solution:

A method for preparing a thermoplastic polyurethane elastomer material with micro air holes includes the following steps:

(1) feeding liquid raw materials including diisocyanate molecules and polyol, and solid additives into a double-screw reactor to trigger a polymerization type chain extension reaction so as to obtain a macromolecular weight hot melt;

(2) pushing the macromolecular weight hot melt obtained in step (1) into a mixing extruder via the exit of the double-screw reactor, and allowing the reaction to continue to generate a macromolecular thermoplastic polyurethane melt with molecular weight distribution in a narrow range;

(3) continuously feeding the obtained macromolecular thermoplastic polyurethane melt into a foaming extruder, and at the same time, adding polymer auxiliary particles, nucleator and a foaming agent into the foaming extruder, well mixing and homogenizing all materials to obtain a mixture, delivering the mixture to a mold head by a melt booster pump under a controlled pressure and at a fixed amount, and extruding the high-pressure hot melt from the mold head into an under-water granulation chamber;

(4) granulating the high-pressure hot melt obtained in step (3) in the underwater granulation chamber, delivering granulated particles into a separator by process water via a multi-stage pressure-release expansion process water pipeline, separating the generated expanded particles from the process water at the separator, screening and drying the expanded particles to obtain the target product.

As a preferable implementation solution, in step (1), the synthesized macromolecular weight hot melt includes the following raw materials in percentage by weight: 20-45% of diisocyanate molecules, 45-70% of polyol, 5-15% of n-butyl alcohol and the allowance of solid additives.

As a more preferable option of the above-mentioned preferable implementation solution, the diisocyanate molecules are diphenylmethane diisocyanate, trimethylene diisocyanate, tetramethylene diisocyanate, pentamethylene diisocyanate, hexamethylene diisocyanate, heptamethylene diisocyanate, octamethylene diisocyanate, 2-methyl-1,5-pentamethylene diisocyanate, 2-ethyl-1,4-butanediyl diisocyanate, 1,5-pentamethylene diisocyanate, 1,4-butanediyl diisocyanate, 1-isocyanate-3,3,5-trimethyl-5-methyl isocyanate cyclohexane, 1,4-bis(methyl isocyanate)cyclohexane, 1,3-bis(methyl isocyanate)cyclohexane, 1,4-cyclohexanediisocyanate, 1-methyl-2,4-cyclohexanediisocyanate, 1-methyl-2, 6-cyclohexanediisocyanate, 2,2'-dicyclohexylmethane diisocyanate, 2,4'-dicyclohexylmethane diisocyanate, 4,4'-dicyclohexylmethane diisocyanate, 2,2'-diphenylmethane diisocyanate, 2, 4'-diphenylmethane diisocyanate, 4,4'-diphenylmethane diisocyanate, 1,5'-naphthalene diisocyanate, 2,4-methylenephenyldiisocyanate, 2,6-methylenephenyldiisocyanate, diphenylmethane diisocyanate, 3,3'-dimethyl-biphenyl diisocyanate, 1,2-diphenylethane diisocyanate or phenylene diisocyanate.

The polyol is polyether glycol or polyester glycol, wherein the polyether glycol is polytetramethylene ether glycol with a molecular weight of 1000-2000, and the polyester glycol is macromolecular glycol with a molecular weight of 1000-3000 that is generated by polymerization of adipic acid and n-butyl alcohol or by polymerization of adipic acid, n-butyl alcohol and propanediol. Preferably, the solid additives include the following ingredients: 0.5-2% of hindered phenol antioxidants (Ciba Irganox1010, Irganoxn1098, Irganox 168), 0.5-2% of hindered amine light stabilizer, and 0.05-0.5% of mold release agent or lubricating agent. More preferably, 0.5-2% of anti-hydrolysis stabilizer can be added. During preparation of the thermoplastic polyurethane, n-butyl alcohol can be replaced by a chain extender. The chain extender is preferably selected from aliphatic, aromatic-aliphatic, aromatic and/or cycloaliphatic compounds, and in a further preferable implementation solution, has a molecular weight in a range of 0.05 kg/mol to 0.5 kg/mol. The chain extender is, for example, a compound with two functional radicals, for example, diamine with 2-10 carbon atoms at the alkylidene portion and/or paraffinic glycol, in particular, 1,4-butanediol, 1,6-hexylene glycol, and/or dialkyl glycol, trialkyl glycol, tetra-alkyl glycol, penta-alkyl glycol, hexa-alkyl glycol, hepta-alkyl glycol, oct-alkyl glycol, nona-alkyl glycol and/or deca-alkyl glycol, each of which has 3-8 carbon atoms, as well as corresponding low-poly(propylene glycol) or poly(propylene glycol).

As a preferable implementation solution, the process conditions of the polymerization type chain extension reaction in step (1) include a heating temperature in a range of 180 to 240° C., and a screw rotation speed in a range of 100 to 1500 rpm;

and the process conditions of the mixing extruder in step (2) include a screw rotation speed in a range of 100 to 300 rpm and a heating temperature in a range of 140 to 220° C.

As a preferable implementation solution, the mixing extruder is also provided with a regulator entrance for feeding a melt strength regulator at the tail end; the melt strength regulator is a polymer of polyhydroxy radicals or polyisocyanate radicals, added in an amount which accounts for 0.1-3 mass percentage of the macromolecular thermoplastic polyurethane melt obtained by the mixing extruder. The polymer of polyhydroxy radicals can be tri (hydroxymethyl) propanel; and the polymer of polyisocyanate radicals can be HDI tripolymer.

As a more preferable option of the above-mentioned preferable implementation solution, in step (3) the weight ratio of the added macromolecular thermoplastic polyurethane melt to the nucleator, the foaming agent is (70-97):(0.01-0.5):(0.1-10).

As a preferable implementation solution, the foaming extruder is also added with the polymer auxiliaries via the front end, and the mass ratio of the added polymer auxiliaries to the macromolecular thermoplastic polyurethane melt is (0.1-30):(70-97);

the polymer auxiliaries are selected from any one or a mixture of several of polyurethane elastomer with a molecular weight in a range of 30000-100000, low-melting-point polyamide, modified polyester, modified PVC, maleic anhydride-methacrylate, grafted polyolefin and grafted SEBS (the melting points of the low-melting-point polyamide and the modified polyester are better controlled to be less than 20° C. lower than the melting point of the thermoplastic polyurethane melt);

the nucleator is selected from at least any one of carbon nano-tube, silicon dioxide, talcum powder, modified calcium carbonate, carbon black and tetrafluoroethylene powder;

and the foaming agent is selected from at least any one of $CO_2$, $N_2$, normal butane, n-pentane and isopentane.

As a preferable implementation solution, the process conditions of the foaming extruder in step (3) include a temperature in a range of 160 to 300° C., and a screw rotation speed in a range of 50-900 rpm;

and the high-pressure hot melt behind the melt booster pump and in front of the mold head is under a pressure in a range of 50-220 bar.

As a preferable implementation solution, the process water in the underwater granulation chamber in step (4) is at a temperature in a range of 10 to 60° C. and under a pressure in a range of 4-15 bar.

As a preferable implementation solution, in step (4), the multi-stage pressure-release expansion process water pipeline is a four-stage process water pipeline, wherein the water pressure is 4-15 bar in the first-stage process water pipe, 3-12 bar in the second-stage process water pipe, 2-6 bar in the third-stage process water pipe, and 1-4 bar in the fourth-stage process water pipe.

According to the disclosure, the preparation process as shown in FIG. 1 includes the following procedures: Firstly, liquid raw materials such as polyether or polyester polyol, diphenylmethane diisocyanate and n-butyl alcohol are fed into the double-screw reactor via a liquid raw materials inlet; at the same time, solid additives (including antioxidants, light stabilizer, UV absorber, anti-adhesive agent, lubricating agent or other modified solid raw materials) are fed into the double-screw reactor via a solid raw materials inlet. In the double-screw reactor, the rotation speed is in a range of 100-1500 rpm, and the heating temperature is in a range of 180-240° C., so that all raw materials together perform a polymerization type chain extension reaction in the double-screw reactor, and the linear balancing chain extension process of molecular chains is controlled by regulating the sequence and amount of adding each of the raw materials, the reaction temperature, the screw rotation speed, etc., thereby accurately regulating the molecular weight of the polymer to generate a linear polyurethane macromolecular polymer with a molecular weight in a range of 100000 to 500000.

Secondly, the macromolecular polymer is pushed into the mixing extruder via the tail end of the double-screw reactor to undergo chain breakage, chain extension, diffusion, distribution, etc. of super-high molecular weight, low molecular weight, cross-linking point, etc.; in the mixing extruder, the screw rotation speed is controlled to be in a range of 100 to 300 rpm, while the screw cavity heating temperature is controlled to be in a range of 140 to 220° C.; at the same time, the mixing extruder is fed with the melt strength regulator at a fixed amount via the tail end according to the specific melt viscosity and strength, thus adjusting the melt strength to meet the material requirements of downstream foaming and expanding procedures.

Thirdly, the polyurethane hot melt enters the melt pump, and the pressure of the melt pump is controlled to be in a range of 5 to 20 bar to stabilize the back pressure of the previous stage of process, and the flow rate and retention time of the melt. Using a quantitative measuring function of the melt pump, the polyurethane hot melt is fed into the foaming extruder via a hot melt inlet; at the same time, the foaming extruder is fed with auxiliary polymer particles, the nucleator, the foaming agent, etc., so that all raw materials are well mixed and homogeneously distributed through the mixing and granulation effect of the foaming extruder, and then the mixed substance is controlled under a certain pressure and delivered in a fixed amount by a melt booster pump. Preferably, the inlet pressure of the melt booster pump is set to be in a range of 50 to 200 bar; the melt pressure in a screw cavity of the extruder is controlled to be stable, and the melt pressure in front of an orifice plate is indirectly controlled to be in a range of 50 to 220 bar.

Fourth point being, the high-pressure hot melt is steadily pushed into the mold head of the foaming extruder, wherein the mold heat is of a porous plate structure, with a uniform heating facility to ensure that the hot melt can steadily pass the mold head. The hot melt provided by the melt booster pump at high pressure passes through the orifices of the mold head and is then granulated into soybean-shaped particles by a granulation cutter that rotates at high speed in the underwater granulation chamber, whereby the underwater granulation chamber granulates hot melting under water. The process water at a temperature in a range of 10 to 60° C. generates a 4-15 bar pressure by the effect of a process water pump, and enters the underwater granulation chamber via a process water inlet pipe of the underwater granulation chamber. In this way, the high-pressure hot melt is quickly cooled by the high-pressure process water and is granulated by the granulation cutter. The high-pressure hot melt and the high-pressure process water produce a differential pressure that can be regulated by the inlet pressure of the melt booster pump and the pressure of a variable frequency process water pump, so that the initial expansion rate and factor of the polymer particles are managed and stable throughout the process. Since the cooling time of the newly granulated polymer particles is short and material crystallization speed varies a lot in different formulas, a multi-stage pressure-release expansion process water pipeline is specifically designed in this process, which allows gradual pressure drop stage by stage.

Based on the principle that the strength and pressure bearing conditions increase as the outer surfaces of the polymer particles stay in process water for a longer time, the disclosure preferably adopts a four-stage pressure-release expansion process water pipeline, wherein the water pressure is still maintained in a range of 4 to 15 bar in the first-stage process water pipe, and in such circumstance, the melt particles are partly cooled and initially expand under a differential pressure.

In the second-stage process water pipe, the water pressure is lowered to 3-12 bar through increasing the pipe diameter and shortening the pipe. In such circumstance, the melt particles are further cooled, and the strength of the outer surfaces increases, but expansion occurs again after the differential pressure increases.

In the third-stage process water pipe, the pipe resistance is reduced through increasing the pipeline diameter and shortening the pipe to lower the water pressure to 2-6 bar. In such circumstance, the melt particles are further cooled, and the strength of the outer surfaces increases, but expansion occurs again after the differential pressure increases. However, the expansion rate drops to a very low level because the particle crystallization is about to be completed. In the fourth-stage process water pipe, the pipe resistance is lowered through adjusting the pipe diameter and length to reduce the water pressure to 1-4 bar. In such circumstance, the melt particles are continuously cooled, and the strength of the outer surfaces is further enhanced, but expansion occurs again after the differential pressure increases. However, due to sufficient cooling time, very high strength of the outer surfaces of the particles and basically completed particle crystallization, the outer diameters of the particles are firmly finalized. The expanded polymer particles and water jointly enter a centrifugal separator. The water and the expanded polymer particles are separated in the separator. The expanded particles enter a vibrating screen and then a post-treatment system, and the process water flows out of the centrifugal separator and then flows into a process water tank and the process water pump. The above procedures are repeated so that the process proceeds continuously.

Unless otherwise specified, all raw materials and involved process steps in the disclosure may be any raw materials or process technologies that are known by those skilled in this field. For example, the thermoplastic polyurethane may be directly selected from commercially available products or prepared by the known process technologies. More preferably, the thermoplastic polyurethane can be polyether or polyester type thermoplastic polyurethane according to the product demands.

According to the disclosure, during preparation, the sizes, dimensions and density of inner micro air holes and the forms, dimensions and density of the inner and surface bubble holes of expanded particles are designed and controlled through selection of raw materials and optimization of formulas; at the same time, the expansion of bubble cores is controlled through the pressure on the polymer hot melt in the screw cavity of the double-screw extruder and the pressure at the moment when the polymer hot melt is extruded out of the extruder; and finally, the expanded material is controlled be cured and finalized through the difference between the melt pressure and the process water pressure and by the method of slow pressure release of the process water.

Preferably, according to the disclosure, a macromolecular TPU hot melt with a molecular weight in a range of 100000 to 500000 is prepared at first; then, the hot melt is directly sent into the foaming extruder to be mixed and melted with polymer auxiliaries (including TPU with a low molecular weight of 30000-100000), the nucleator and the foaming agent; next, since the foaming agent presents different foaming capacities in the macromolecular TPU hot melt and in the polymer auxiliaries, a controllable expansion treatment is carried out to respectively obtain a support component of an extremely closed micro air hole structure and an open foaming component, and the two components jointly form a compound expanded material with a coiled, network-shaped and cross-linking air channel structure.

In the disclosure, on the one hand, the macromolecular weight TPU and the foaming agent form numerous 0.01-20 μm closed micro air holes by the effect of the nucleator, and the closed micro air holes serve as the support component in the expanded material. On the other hand, the polymer auxiliaries such as the low-molecular weight TPU and the foaming agent form extremely micro open bubble holes (non-closed holes), which together with some expanded particles form a pressure-resistant slow rebound component; the open bubble holes form air channels that coil the closed micro air holes in the expanded material, and the air channels partly communicate with one another and extend to the surfaces of the expanded particles. In this way, when the expanded material is extruded, the closed micro air holes which serve as the support component are extruded to play the supporting role, while the air in the open bubble holes in the pressure-resistant slow rebound component is quickly extruded out, which endows the expanded material with a good extrusion flexible feeling; when the extrusion force disappears, the closed micro air holes support the expanded material to reset, and outside air is then absorbed into the open bubble holes.

Besides, according to the disclosure, in the preparation process, the dimensions and number of micro air holes and the dimensions, shapes and number of the open bubble holes in the expanded material can be controlled to adjust the physical properties of the material to meet various downstream purposes and customer requirements according to the permeability difference of different foaming agents in different polymer materials, the melt strength difference of different materials caused by different differential pressures and melt crystallization speed, and the difference of different polymers in changes and retention of physical properties.

According to the disclosure, in the preparation process, when large open holes are required or when the ratio of the open bubble holes is small, the inlet pressure of the melt booster pump can be increased at a constant process water temperature to improve the inlet pressure of the mold head, and the pressure release can be accelerated using the pressure of the process water. When small open holes are required or when the ratio of the open bubble holes needs to be reduced, the inlet pressure of the melt booster pump can be reduced at a constant process water temperature to indirectly reduce the inlet pressure of the mold head, and pressure release can be slowed down by the pressure of the process water.

Compared with the prior art, the disclosure has the following beneficial effects:

(1) According to the disclosure, MDI, polyester or polyether polyol, etc. are directly used to prepare the macromolecular weight TPU hot melt, and the hot melt is directly mixed, homogenized and foamed with the subsequent polymer auxiliaries, nucleator and foaming agent, thus removing the procedure of granulating macromolecular weight TPU, greatly lowering energy and material consumption, and enhancing the product yield and production efficiency.

(2) Compared with common expanded materials with closed micro holes that are made from a polymer raw material with a single physical property, the product finally obtained by the disclosure actually includes two kinds of polymer raw materials with different physical properties, so that a coiled, network-like and cross-linking air channel structure including proper micro air holes and appropriate open bubble holes is formed in the expanding and foaming process. In this way, the micro air holes can endow the material with excellent physical properties such as strength, elastic modulus and rebound force, and the open bubble holes can enhance the energy absorption and storage properties, contact feeling and comfort feeling of the material.

(3) Adjustment in the formulas and process conditions can help effectively regulate the structures, densities and dimensions of the micro air holes and the open bubble holes and the opening form of the open bubble holes, and control the micro air holes and the open bubble holes to respectively account for 20-99.5% and 0.5-80% of the material by volume.

(4) According to the disclosure, in the preparation process, the speed and factor of expansion through pressure release can be stabilized by control over the back pressure of the hot melt in the double-screw extruder and the back pressure of the underground granulation chamber, thus meeting the requirement of accurately controlling the expansion factor of the material.

(5) Multi-stage gradual pressure release is adopted to allow flexible control over the bubble breaking rate of different polymers in the expansion process, so that an appropriate expanded compound material can be manufactured.

(6) The polymer elastomer material prepared by the disclosure is applicable to application fields of expanded materials such as shoe products, packing materials, shock absorption materials, heat insulating materials, tracks, and solid tyres.

Figure 1:
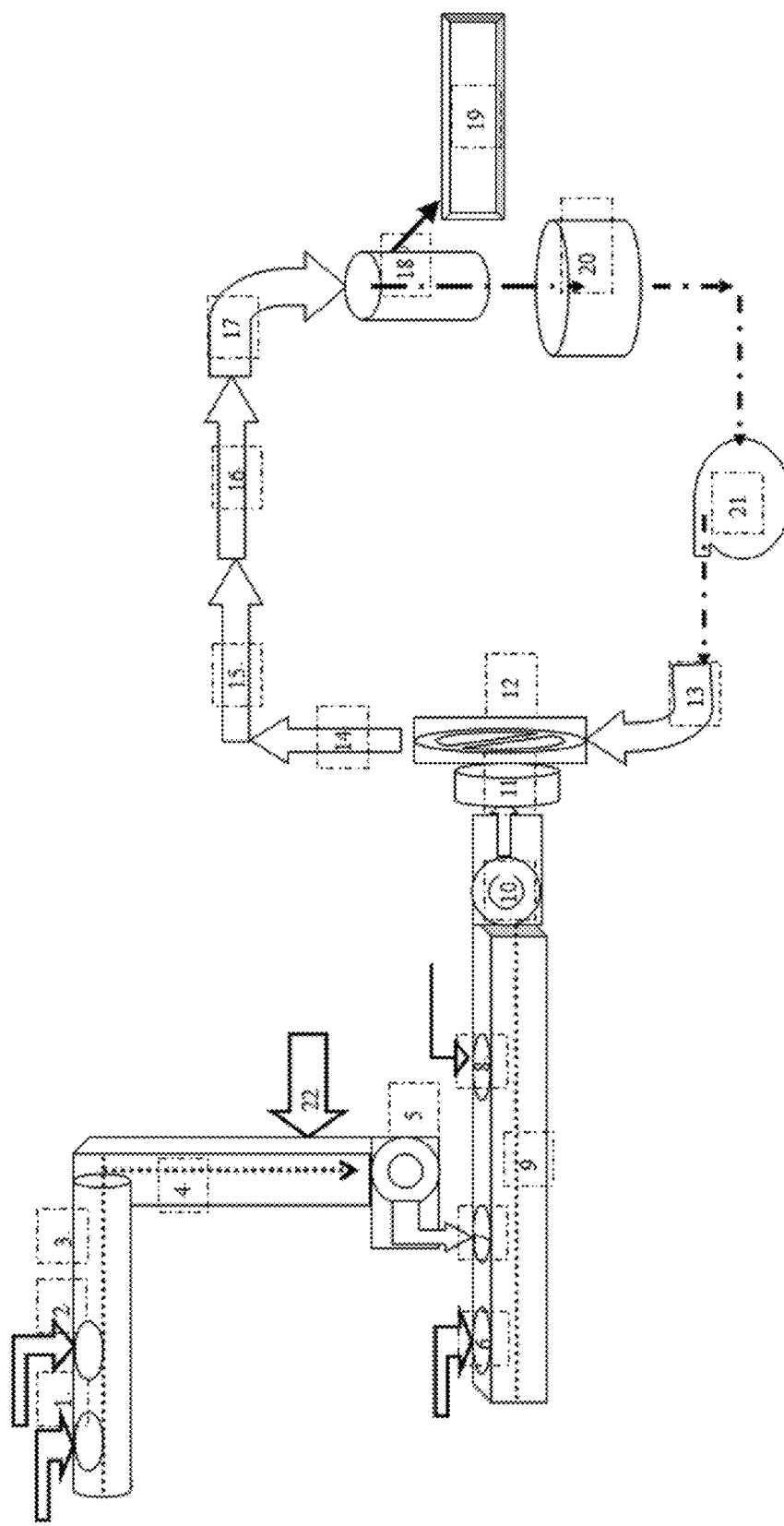
FIG. 1 is a process flowchart of the disclosure.

In the drawings, 1—liquid raw material inlet; 2—solid raw material inlet; 3—double-screw reactor; 4—mixing extruder; 5—melt pump; 6—solid material inlet; 7—hot melt entrance; 8—foaming agent inlet; 9—foaming extruder; 10—melt booster pump; 11—mold head; 12—underwater granulation chamber; 13—process water inlet pipe; 14—first-stage process water pressure release pipe; 15—second-stage process water pressure release pipe; 16—third-stage process water pressure release pipe; 17—fourth-stage process water pressure release pipe; 18—centrifugal separator; 19—vibrating screen; 20—process water tank; 21—process water pump; 22—melt strength regulator feeding port.

DETAILED DESCRIPTION

The disclosure is further described in detail in conjunction with the attached drawings and specific embodiment.

It is necessary to point out that the following embodiment is intended only for further describing the disclosure and cannot be understood as limitations to the protective scope of the disclosure. Those skilled in this field can make some non-essential improvements and adjustments according to the content of the disclosure, which shall still fall within the protective scope of the disclosure.

Besides, unless otherwise specified, all raw materials are commercially available.

The contents of the disclosure can be more easily understood by referring to the detailed description of the preferable implementation methods and inclusive embodiments of the disclosure below. Unless otherwise specified, all technologies and scientific terms used in this text have meanings that can be generally understood by the ordinarily skilled in the field. If contradictions arise, the definition in the Description shall prevail.

For example, terms "is prepared by" and "comprising" used in this text are synonymous. Terms "including", "comprising", "having" and "containing" or any other modifications used in this text are intended for non-exclusive inclusion. For example, compositions, procedures, methods, products or devices including listed factors are not necessarily limited to the factors, but can include all other unlisted factors, or their inherent factors.

When values, concentrations, or other values or parameters are expressed by a scope, a preferable scope, or a scope defined by a series of upper preferred values and lower preferred values, this should be understood as that all scopes defined by any match of an upper limit in any scope or a preferred value and a lower limit in any scope or a preferred value are specifically disclosed, regardless of whether or not the scopes are individually disclosed. For example, when a scope of 1 to 5 is disclosed, the described scope should be understood to include a scope of "1 to 4", a scope of "1 to 3", a scope of "1 to 2", a scope of "1 to 2 and 4 to 5", a scope of "1 to 3 and 5", etc. When the scope of a numerical value is described in this text, unless otherwise specified, the scope is intended for including end values and all integers and fractions in this scope.

Approximate words used in the Description and the Claims are adjuncts of the quantifier, indicating that the disclosure is not limited to the specific quantity, but also includes acceptable revision portions which approach the quantity, but do not cause changes in the relevant basic functions. Correspondingly, "approximate" and "about" are adjuncts of a numerical value, meaning that the disclosure is not limited to the accurate numerical value. In some cases, approximation words may be corresponding to the accuracy of instruments for measuring the numerical values. In the Description and Claims of the present application, scope definitions can be combined and/or exchanged. Unless otherwise specified, each of those scopes includes all subscopes there-between.

In addition, indefinite articles "a" and "an" in front of the factors or ingredients in the disclosure do not limit the quantity of the factors or ingredients. Therefore, "a" and "an" should be understood to include "one" or "at least one", and a singular factor or ingredient also includes the plural form, unless the described number obviously indicates the singular form.

"Polymer" refers to a polymer compound prepared by polymerizing identical or different types of monomers. The general term "polymer" contains terms "homopolymer", "co-polymer", "terpolymer" and "interpolymer".

A method for preparing a thermoplastic polyurethane elastomer material with micro air holes includes the following steps:

(1) feeding liquid raw materials that include diisocyanate molecules and polybasic alcohol and solid additives into a double-screw reactor, wherein a polymerization type chain extension reaction occurs to obtain a macromolecular weight hot melt;

(2) pushing the macromolecular weight hot melt obtained in step (1) into a mixing extruder via the exit of the double-screw reactor, wherein the reaction continues to generate a macromolecular thermoplastic polyurethane melt with a narrow molecular weight distribution range;

(3) continuously feeding the obtained macromolecular thermoplastic polyurethane melt into a foaming extruder, and at the same time, adding polymer particle auxiliaries, nucleator and a foaming agent into the foaming extruder, well blending and homogenizing all materials to obtain a mixture, pumping the mixture to a mold head by a melt booster pump under a controlled pressure and at a fixed amount, and extruding a high-pressure hot melt from the mold head into an under-water granulation chamber;

(4) granulating the high-pressure hot melt obtained in step (3) in the underwater granulation chamber, delivering granulated particles into a separator by process water via a multi-stage pressure-release expanding process water pipeline, separating the generated expanded particles from the process water at the separator, screening and drying the expanded particles to obtain the target product.

As a preferable implementation solution, in step (1), the synthesized macromolecular weight hot melt includes the following raw materials in percentage by weight: 20-45% of diisocyanate molecules, 45-70% of polyol, 5-15% of n-butyl alcohol and the allowance of solid additives.

As a more preferable option of the above-mentioned preferable implementation solution, the diisocyanate molecules are diphenylmethane diisocyanate (to be supplemented);

the polyol is polyether glycol or polyester glycol, wherein the polyether glycol is polytetramethylene ether glycol with a molecular weight of 1000-2000, and the polyester glycol is macromolecular glycol with a molecular weight of 1000-3000 that is generated by polymerization of adipic acid and n-butyl alcohol or by polymerization of adipic acid, n-butyl alcohol and propanediol (to be supplemented).

Preferably, the solid additives include the following ingredients: 0.5-2% of hindered phenol antioxidants (Ciba Irganox1010, Irganoxn1098, Irganox 168), 0.5-2% of hindered amine light stabilizer, and 0.05-0.5% of mold release agent or lubricating agent. More preferably, 0.5-2% of anti-hydrolysis stabilizer can be added.

As a preferable implementation solution, the process conditions of the polymerization type chain extension reaction in step (1) include a heating temperature in a range of 180 to 240° C., and a screw rotation speed in a range of 100 to 1500 rpm;

and the process conditions of the mixing extruder in step (2) include a screw rotation speed in a range of 100 to 300 rpm and a heating temperature in a range of 140 to 220° C.

As a preferable implementation solution, the mixing extruder is also provided with a regulator entrance for feeding a melt strength regulator at the tail end; the melt strength regulator is a polymer of polyhydroxy radicals or polyisocyanate radicals, added in an amount which accounts for 0.1-3 mass percentage of the macromolecular thermoplastic polyurethane melt obtained by the mixing extruder. The polymer of polyhydroxy radicals can be tri (hydroxymethyl) propanel; and the polymer of polyisocyanate radicals can be HDI tripolymer.

As a more preferable option of the above-mentioned preferable implementation solution, in step (3) the weight ratio of the added macromolecular thermoplastic polyurethane melt to the nucleator, the foaming agent and the melt strength regulator is (70-97):(0.01-0.5):(0.1-10).

As a preferable implementation solution, the foaming extruder is also added with the polymer auxiliaries via the front end, and the mass ratio of the added polymer auxiliaries to the macromolecular thermoplastic polyurethane melt is (0.1-30):(70-97);

the polymer auxiliaries are selected from any one or a mixture of several of polyurethane elastomer with a molecular weight in a range of 30000-100000, low-melting-point polyamide, modified polyester, modified PVC, maleic anhydride-methacrylate, grafted polyolefin and grafted SEBS (the melting points of the low-melting-point polyamide and the modified polyester are better controlled to be less than 20° C. lower than the melting point of the thermoplastic polyurethane melt);

the nucleator is selected from at least any one of carbon nano-tube, silicon dioxide, talcum powder, modified calcium carbonate, carbon black and tetrafluoroethylene powder;

and the foaming agent is selected from at least any one of CO2, N2, normal butane, n-pentane and isopentane.

As a preferable implementation solution, the process conditions of the foaming extruder in step (3) include a temperature in a range of 160 to 300° C., and a screw rotation speed in a range of 50 to 900 rpm;

and the high-pressure hot melt behind the melt booster pump and in front of the mold head is under a pressure in a range of 50-220 bar.

As a preferable implementation solution, the process water in the underwater granulation chamber in step (4) is at a temperature in a range of 10 to 60° C. and under a pressure in a range of 4 to 15 bar.

As a preferable implementation solution, in step (4), the multi-stage pressure-release expansion process water pipeline is a four-stage process water pipeline, wherein the water pressure is 4-15 bar in the first-stage process water pipe, 3-12 bar in the second-stage process water pipe, 2-6 bar in the third-stage process water pipe, and 1-4 bar in the fourth-stage process water pipe.

According to the disclosure, the preparation process as shown in FIG.1 includes the following procedures: First, liquid raw materials such as polyether or polyester polyol, diphenylmethane diisocyanate and n-butyl alcohol are fed into the double-screw reactor via a liquid raw materials inlet 1; at the same time, solid additives (including antioxidants, light stabilizer, UV absorber, anti-adhesive agent, lubricating agent or other modified solid raw materials) are fed into the double-screw reactor 3 via a solid raw materials inlet 2. In the double-screw reactor 3, the rotation speed is in a range of 100 to 1500 rpm, and the heating temperature is in a range of 180 to 240° C., so that all raw materials perform a polymerization type chain extension reaction in the double-screw reactor 3, and the linear balancing chain extension process of molecular chains is controlled through regulating the sequence and amount of adding each of the raw materials, reaction temperature, screw rotation speed, etc., thereby accurately regulating the molecular weight of the polymer to generate a linear polyurethane macromolecular polymer with a molecular weight in a range of 100000 to 500000. Second, the macromolecular polymer is pushed into the mixing extruder 4 via the tail end of the double-screw reactor 3 to undergo chain breakage, chain extension, diffusion, distribution, etc. of super-high molecular weight, low molecular weight, cross-linking point, etc.; in the mixing extruder 4, the screw rotation speed is controlled to be in a range of 100 to 300 rpm, while the screw cavity heating temperature is controlled to be in a range of 140 to 220° C.; at the same time, the mixing extruder 4 is fed with the melt strength regulator at a fixed amount via a melt strength regulator feeding port 22 at the tail end according to the specific melt viscosity and strength so as to regulate the melt strength to meet the material requirements of downstream foaming and expanding procedures. Third, the polyurethane hot melt enters the melt pump 5, and the pressure of the melt pump is controlled to be in a range of 5 to 20 bar to stabilize the back pressure of the previous stage of process, and the flow rate and retention time of the melt. Using the a quantitative measurement function of the melt pump 5, the polyurethane hot melt is fed into the foaming extruder 9 via a hot melt inlet 7; at the same time, the foaming extruder 9 is fed with solid raw materials including the polymer auxiliaries, the nucleator and the foaming agent via a solid material inlet 6 and the foaming agent via a foaming agent inlet 8, so that all raw materials are well mixed and homogeneously distributed through the mixing and granulation effects of the foaming extruder 9, and then the mixed substance is controlled under a certain pressure and delivered in a fixed amount by a melt booster pump 10. Preferably, the inlet pressure of the melt booster pump 10 is set to be in a range of 50 to 200 bar; the melt pressure in a screw cavity of the extruder 9 is controlled to be stable, and the melt pressure in front of the mold head 11 is indirectly controlled to be in a range of 50 to 220 bar. Fourth, the high-pressure hot melt is steadily pushed into the mold head 11 of the foaming extruder 9, wherein the mold heat 11 is of a porous plate structure with a uniform heating facility to ensure that the hot melt can steadily pass the mold head 11. The hot melt delivered by the melt booster pump 10 at a high pressure passes orifices of the mold head 11, and then is granulated into soybean-shaped particles by a granulation cutter which is rotating at a high speed in the underwater granulation chamber 12, wherein the granulation cutter of the underwater granulation chamber 12 actually granulates hot melt under water. The process water at a temperature in a range of 10 to 60° C. generates a 4-15 bar pressure by the effect of a process water pump 21, and enters the underwater granulation chamber 12 via a process water inlet pipe 13 of the underwater granulation chamber 12. In this way, the high-pressure hot melt is quickly cooled by the high-pressure process water and is granulated by the granulation cutter. The high-pressure hot melt and the high-pressure process water generate a differential pressure which can be regulated according to the inlet pressure of the melt booster pump 10 and the pressure of a variable frequency process water pump 21, so that the initial expansion rate and factor of the polymer particles are under control and keep stable in the whole process. Since the cooling time of the just granulated polymer particles is short and the material crystallization speed varies a lot in different formulas, the disclosure specially adopts a multi-stage pressure-release expansion process water pipeline. Based on the principle that the strength and the pressure bearing conditions increase as the outer surfaces of the polymer particles stay in process water for a longer time, the pressure is still maintained in a range of 4 to 15 bar in the first-stage process water pipe 14, and in such circumstance, the melt particles are partly cooled and initially expand under a differential pressure. In the second-stage process water pipe 15, the water pressure is lowered to 3-12 bar through increasing the pipeline diameter and shortening the pipeline. In such circumstance, the melt particles are further cooled, and the strength of the outer surfaces increases, but expansion occurs again after the differential pressure increases. In the third-stage process water pipe 16, the water pressure is lowered to 2-6 bar through increasing the pipe diameter, shortening the pipe and lowering the pipe resistance. In such circumstance, the melt particles are further cooled, and the strength of the outer surfaces increases, but expansion occurs again after the differential pressure increases. However, the expansion rate drops to a very low level because particle crystallization is about be completed. In the fourth-stage process water pipe 17, the pipe resistance is lowered by regulating the pipe diameter and length to reduce the water pressure to 1-4 bar. In such circumstance, the melt particles are continuously cooled, and the strength of the outer surfaces is enhanced, but expansion occurs again after the differential pressure increases. However, due to sufficient cooling time, very high strength of the outer surfaces of the particles and basically completed particle crystallization, the outer diameters of the particles are firmly finalized. The expanded polymer particles and water jointly enter a centrifugal separator 18. The water and the expanded polymer particles are separated in the separator. The expanded particles enter a vibrating screen 19 and then a post-treatment system, and the process water flows out of the centrifugal separator and then into a process water tank 20 and the process water pump. The above procedures are repeated so that the process proceeds continuously.

Besides, it needs to be noted that the formula disclosed above is merely a basic formula of the disclosure. On the basis of the basic formula disclosed by the disclosure, those skilled in this field can add other conventional auxiliaries into the formula, for example, antioxidants and anti-aging agents which can improve the anti-aging performance of the product.

In the following embodiment, raw materials used include: the polyether type and polyester type thermoplastic polyurethane from Bayer and Huntsman, the modified low-melting-point polyester PET and the PBT from Sinopec Shanghai Petrochemical Company Limited, the modified low-melting-point polyamide from DuPont and Evonik, the modified PVC from Formosa Plastics Corporation, the maleic anhydride-methacrylate from Rohm & Haas, the grafted polyolefin from DOW and DuPont, and the grated SEBS from DOW and DuPont.

Embodiment 1

Based on the process flow as shown in FIG. 1, a hot loss type polyurethane elastomer material with micro air holes of the disclosure was prepared according to the following raw material formula and process conditions:

In this embodiment, the used raw materials in percentage by weight included: 55-70% of polyol, wherein the polyol preferably was polytetrafluoroethylene glycol with a molecular weight of 1000-2000, 20-35% of diphenylmethane diisocyanate, 5-15% of n-butyl alcohol, 0.5-2% of hindered phenolic antioxidant (Ciba Irganox1010), 0.5-2% of hindered amine light stabilizer, and 0.05-0.5% of mold release agent. In the double-screw reactor, a polymerization type chain extension reaction occurred to generate a linear macromolecular polyurethane polymer with a molecular weight in a range of 100000 to 500000. The double-screw reactor worked at a heating temperature in a range of 180 to 240° C. and a rotation speed in a range of 100 to 1500 rpm; and the mixing extruder worked at a rotation speed in a range of 100 to 300 rpm, and a heating temperature in a range of 140 to 220° C.

The polymer auxiliary was polyether type thermoplastic polyurethane with a molecular weight Mw of 50000-100000; the nucleator was calcium carbonate, silicon dioxide or talcum powder; the foaming agent was $CO_2$, $N_2$ or $CO_2+N_2$; and the melt strength regulator was a polymer of polyhydroxy radicals or polyisocyanate radicals, added in an amount which accounted for 0.1-3 mass percentage of the macromolecular polyurethane hot melt generated by the mixing extruder. The delivery capacity of the melt pump was controlled to ensure that the weight ratio of the macromolecular polyurethane hot melt that was delivered by the melt pump into the foaming extruder to the polymer auxiliary, the nucleator and the foaming agent was (70-97):(0.1-30):(0.01-0.5):(0.1-10).

In addition, the length-diameter ratio L/D of the foaming extruder was in a range of 40 to 56; the heating temperature was in a range of 160 to 220° C.; the process water pressure was in a range of 4 to 15 bar; the process water temperature was in a range of 10 to 60° C., and the pressure of the high-pressure hot melt in front of the mold head was controlled to be in a range of 50 to 220 bar. In the multi-stage pressure-release expansion process water pipeline, the water pressure was controlled to be about 4-15 bar in the first-stage process water pipe, about 3-12 bar in the second-stage process water pipe, about 2-6 bar in the third-stage process water pipe, and about 1-4 bar in the fourth-stage process water pipe.

Figure 2:
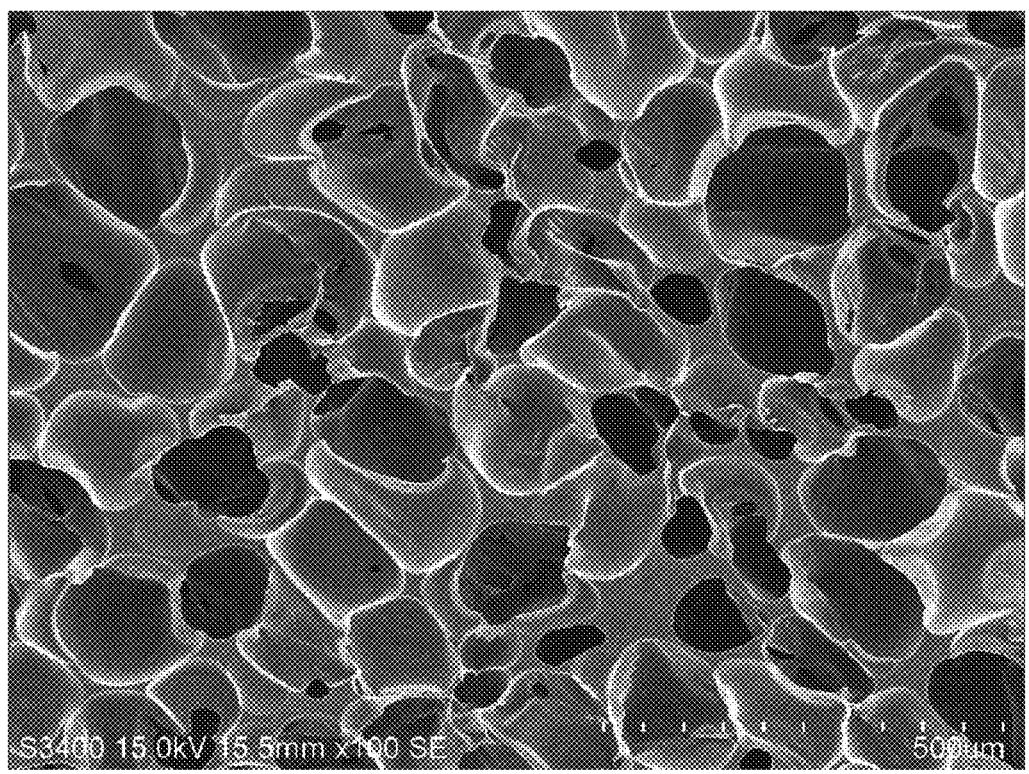
FIG. 2 is an SEM picture of the interior of a material prepared in embodiment 1 of the disclosure.
Figure 3:
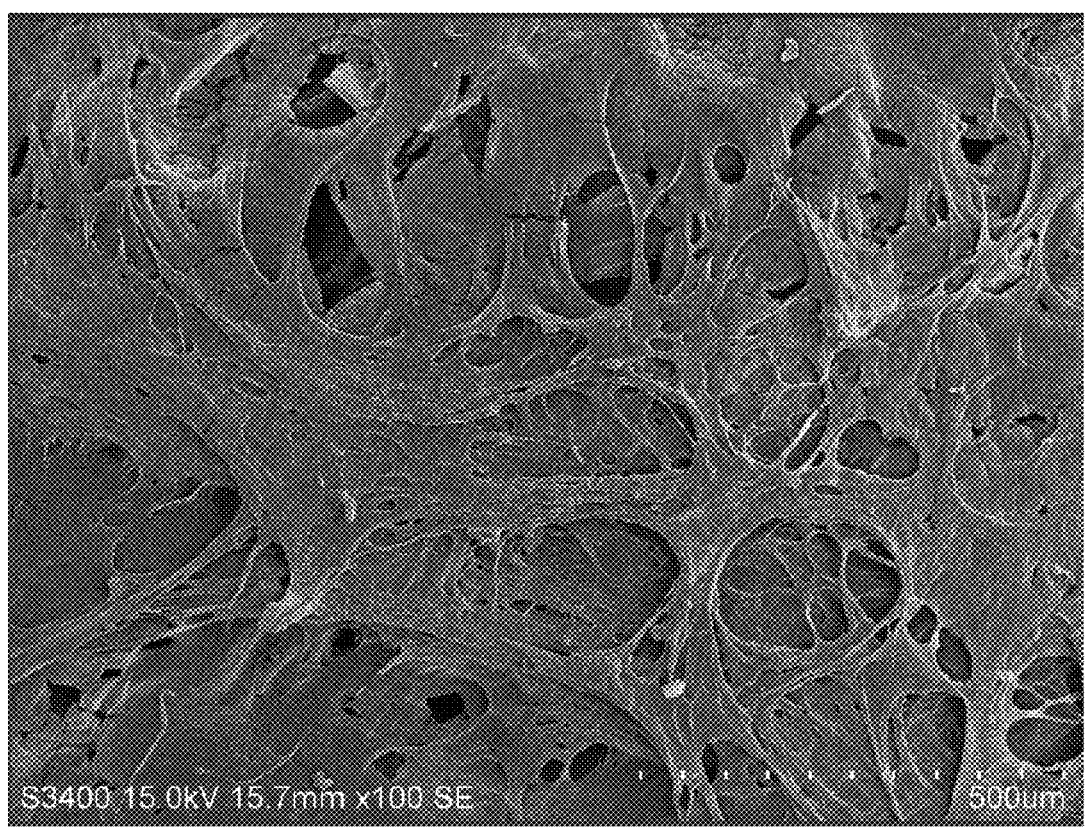
FIG. 3 is an SEM picture of the exterior of the disclosure material prepared in embodiment 1 of the disclosure.

Finally, tests found that, as shown in FIG. 2 and FIG. 3, the prepared product had a coiled, network-like and cross-linking air channel structure inside formed by micro air holes and open bubble holes, and some air channels even extended to the particle surfaces of the product.

Embodiment 2

Based on the process flow as shown in FIG. 1, a hot loss type polyurethane elastomer material with micro air holes of the disclosure was prepared according to the following raw material formula and process conditions:

In this embodiment, the following raw materials in percentage by weight were used: 55% of polyol, wherein the polyol preferably was polytetrafluoroethylene glycol with a molecular weight of about 1000, 35% of diphenylmethane diisocyanate, 5.5% of n-butyl alcohol, 2% of hindered phenolic antioxidant (Ciba Irganox1010), 2% of hindered amine light stabilizer, and 0.5% of mold release agent. In the double-screw reactor, a polymerization type chain extension reaction occurred to generate a linear macromolecular polyurethane polymer with a molecular weight of about 300000.

The double-screw reactor worked at a heating temperature of 180° C. and a rotation speed of 800 rpm; and the mixing extruder worked at a rotation speed of 100 rpm, and a heating temperature of 140° C.

The polymer auxiliary was polyether type thermoplastic polyurethane with a molecular weight Mw of about 80000; the nucleator was calcium carbonate; the foaming agent was $CO_2$; and the melt strength regulator was a polymer of polyhydroxy radicals. The delivery capacity of the melt pump was controlled to ensure that the weight ratio of the macromolecular polyurethane hot melt that was delivered by the melt pump into the foaming extruder to the polymer auxiliary, the nucleator, the foaming agent and the melt strength regulator was 70:0.1:0.01:0.1:0.1.

In addition, the length-diameter ratio L/D of the foaming extruder was 40; the heating temperature was 160° C.; the process water pressure was 4 bar; the process water temperature was 10° C., and the pressure of the high-pressure hot melt in front of the mold head was controlled to be 50 bar. In the multi-stage pressure-release expansion process water pipeline, the water pressure was controlled to be about 4 bar in the first-stage process water pipe, about 3 bar in the second-stage process water pipe, about 2 bar in the third-stage process water pipe, and about 1 bar in the fourth-stage process water pipe.

Finally, tests found that the prepared product had a coiled, network-like and cross-linking air channel structure inside formed by micro air holes and open bubble holes.

Embodiment 3

Based on the process flow as shown in FIG. 1, a hot loss type polyurethane elastomer material with micro air holes of the disclosure was prepared according to the following raw material formula and process conditions:

In this embodiment, the following raw materials in percentage by weight were used: 70% of polyol, wherein the polyol preferably was polytetrafluoroethylene glycol with a molecular weight of 2000, 20% of diphenylmethane diisocyanate, 6% of n-butyl alcohol, 1.96% of hindered phenolic antioxidant (Ciba Irganox1010), 1.99% of hindered amine light stabilizer, and 0.05% of mold release agent. In the double-screw reactor, a polymerization type chain extension reaction occurred to generate a linear macromolecular polyurethane polymer with a molecular weight of about 100000. The double-screw reactor worked at a heating temperature of 240° C. and a rotation speed of 1500 rpm; and the mixing extruder worked at a rotation speed of 300 rpm, and a heating temperature of 220° C.

The polymer auxiliary was polyether type thermoplastic polyurethane with a molecular weight Mw of about 50000; the nucleator was talcum powder; the foaming agent was $N_2$; and the melt strength regulator was a polymer of polyisocyanate radicals. The delivery capacity of the melt pump was controlled to ensure that the weight ratio of the macromolecular polyurethane hot melt that was delivered by the melt pump into the foaming extruder to the polymer auxiliary, the nucleator, the foaming agent and the melt strength regulator was 97:30:0.5:10:5.

In addition, the length-diameter ratio L/D of the foaming extruder was 56; the heating temperature was 220° C.; the process water pressure was 15 bar; the process water temperature was 60° C., and the pressure of the high-pressure hot melt in front of the mold head was controlled to be 220 bar. In the multi-stage pressure-release expansion process water pipeline, the water pressure was controlled to be about 15 bar in the first-stage process water pipe, about 12 bar in the second-stage process water pipe, about 6 bar in the third-stage process water pipe, and about 4 bar in the fourth-stage process water pipe.

Finally, tests found that the prepared product had a coiled, network-like and cross-linking air channel structure inside formed by micro air holes and open bubble holes.

Embodiment 4

Based on the process flow as shown in FIG. 1, a hot loss type polyurethane elastomer material with micro air holes of the disclosure was prepared according to the following raw material formula and process conditions:

In this embodiment, the following raw materials in percentage by weight were used: 45% of polyol, wherein the polyol preferably was polytetrafluoroethylene glycol with a molecular weight in a range of 1000-2000, 38% of diphenylmethane diisocyanate, 15% of n-butyl alcohol, 1% of hindered phenolic antioxidant (Ciba Irganox1010), 0.8% of hindered amine light stabilizer, and 0.2% of mold release agent. In the double-screw reactor, a polymerization type chain extension reaction occurred to generate a linear macromolecular polyurethane polymer with a molecular weight in a range of 200000 to 500000. The double-screw reactor worked at a heating temperature of 200° C. and a rotation speed of 500 rpm; and the mixing extruder worked at a rotation speed of 200 rpm, and a heating temperature of 180° C.

The polymer auxiliary was polyether type thermoplastic polyurethane with a molecular weight Mw in a range of 50000 to 100000; the nucleator was carbon black; the foaming agent was $CO_2+N_2$; and the melt strength regulator was a polymer of polyhydroxy radicals or polyisocyanate radicals. The delivery capacity of the melt pump was controlled to ensure that the weight ratio of the macromolecular polyurethane hot melt that was delivered by the melt pump into the foaming extruder to the polymer auxiliary, the nucleator, the foaming agent and the melt strength regulator was 85:10:0.2:5:2.

In addition, the length-diameter ratio L/D of the foaming extruder was 50; the heating temperature was 180° C.; the process water pressure was 10 bar; the process water temperature was 30° C., and the pressure of the high-pressure hot melt in front of the mold head was controlled to be 120 bar. In the multi-stage pressure-release expansion process water pipeline, the water pressure was controlled to be about 10 bar in the first-stage process water pipe, about 7 bar in the second-stage process water pipe, about 4 bar in the third-stage process water pipe, and about 2 bar in the fourth-stage process water pipe.

Finally, tests found that the prepared product had a coiled, network-like and cross-linking air channel structure inside formed by micro air holes and open bubble holes.

Embodiment 5

Based on the process flow as shown in FIG. 1, a hot loss type polyurethane elastomer material with micro air holes of the disclosure was prepared according to the following raw material formula and process conditions:

In this embodiment, the following raw materials in percentage by weight were used: 65% of polyol, wherein the polyol preferably was polytetrafluoroethylene glycol with a molecular weight in a range of 1000-2000, 20% of diphenylmethane diisocyanate, 12% of n-butyl alcohol, 1.5% of hindered phenolic antioxidant (Ciba Irganox1010), 1.2% of hindered amine light stabilizer, and 0.3% of mold release agent. In the double-screw reactor, a polymerization type chain extension reaction occurred to generate a linear macromolecular polyurethane polymer with a molecular weight in a range of 100000 to 500000. The double-screw reactor worked at a heating temperature of 220° C. and a rotation speed of 800 rpm; and the mixing extruder worked at a rotation speed of 150 rpm, and a heating temperature of 160° C.

The polymer auxiliary was polyether type thermoplastic polyurethane with a molecular weight Mw in a range of 50000 to 100000; the nucleator was tetrafluoroethylene powder; the foaming agent was $CO_2+N_2$; and the melt strength regulator was a polymer of polyhydroxy radicals or polyisocyanate radicals. The delivery capacity of the melt pump was controlled to ensure that the weight ratio of the macromolecular polyurethane hot melt that was delivered by the melt pump into the foaming extruder to the polymer auxiliary, the nucleator, the foaming agent and the melt strength regulator was 75:15:0.1:5:3.

In addition, the length-diameter ratio L/D of the foaming extruder was 44; the heating temperature was 180° C.; the process water pressure was 8 bar; the process water temperature was 25° C., and the pressure of the high-pressure hot melt in front of the mold head was controlled to be 100 bar. In the multi-stage pressure-release expansion process water pipeline, the water pressure was controlled to be about 8 bar in the first-stage process water pipe, about 6 bar in the second-stage process water pipe, about 4 bar in the third-stage process water pipe, and about 1 bar in the fourth-stage process water pipe.

Finally, tests found that the prepared product had a coiled, network-like and cross-linking air channel structure inside formed by micro air holes and open bubble holes.

Embodiment 6

Based on the process flow as shown in FIG. 1, a hot loss type polyurethane elastomer material with micro air holes of the disclosure was prepared according to the following raw material formula and process conditions:

In this embodiment, the following raw materials in percentage by weight were used: 55% of polyol, wherein the polyol preferably was polytetrafluoroethylene glycol with a molecular weight in a range of 1000-2000, 35% of diphenylmethane diisocyanate, 8% of n-butyl alcohol, 1% of hindered phenolic antioxidant (Ciba Irganox1010), 0.6% of hindered amine light stabilizer, and 0.4% of mold release agent. In the double-screw reactor, a polymerization type chain extension reaction occurred to generate a linear macromolecular polyurethane polymer with a molecular weight in a range of 100000 to 500000. The double-screw reactor worked at a heating temperature of 210° C. and a rotation speed of 600 rpm; and the mixing extruder worked at a rotation speed of 150 rpm, and a heating temperature of 180° C.

The polymer auxiliary was polyether type thermoplastic polyurethane with a molecular weight Mw in a range of 50000 to 100000; the nucleator was a mixture of silicon dioxide and carbon nano-tube in a ratio of 1:1; the foaming agent was $CO_2+N_2$; and the melt strength regulator was a polymer of polyhydroxy radicals. The delivery capacity of the melt pump was controlled to ensure that the weight ratio of the macromolecular polyurethane hot melt that was delivered by the melt pump into the foaming extruder to the polymer auxiliary, the nucleator, the foaming agent and the melt strength regulator was 80:20:0.3:4:1.

In addition, the length-diameter ratio L/D of the foaming extruder was 44; the heating temperature was 200° C.; the process water pressure was 12 bar; the process water temperature was 45° C., and the pressure of the high-pressure hot melt in front of the mold head was controlled to be 150 bar. In the multi-stage pressure-release expansion process water pipeline, the water pressure was controlled to be about 12 bar in the first-stage process water pipe, about 10 bar in the second-stage process water pipe, about 6 bar in the third-stage process water pipe, and about 2 bar in the fourth-stage process water pipe.

Finally, tests found that the prepared product had a coiled, network-like and cross-linking air channel structure inside formed by micro air holes and open bubble holes.

Embodiment 7-12

Respectively compared with Embodiment 1-6, all were identical, except polyester glycol with a molecular weight in a range of 1000-3000, which replaced the polyether glycol with a molecular weight in a range of 1000-2000.

Embodiment 13-18

Respectively compared with Embodiment 7-12, all were identical, except a small amount of anti-hydrolysis stabilizer added in the solid additives.

Embodiment 19-24

Respectively compared with Embodiment 1-6, all were identical, except the low-melting-point polyamide (which may be any one or a combination of several ones of PA6I, PA11 and PA12), which replaced the polyether type thermoplastic polyurethane with a molecular weight Mw in a range of 50000 to 100000 among the used polymer auxiliaries.

Embodiment 25-30

Respectively compared with Embodiment 1-6, all were identical, except the modified polyamide, which replaced the polyether type thermoplastic polyurethane with a molecular weight Mw in a range of 50000 to 100000 among the used polymer auxiliaries.

Embodiment 31-36

Respectively compared with Embodiment 1-6, all were identical, except the modified PVC, which replaced the polyether type thermoplastic polyurethane with a molecular weight Mw in a range of 50000 to 100000 among the used polymer auxiliaries.

Embodiment 37-42

Respectively compared with Embodiment 1-6, all were identical, except the maleic anhydride-methacrylate, which replaced the polyether type thermoplastic polyurethane with a molecular weight Mw in a range of 50000 to 100000 among the used polymer auxiliaries.

Embodiment 43-48

Respectively compared with Embodiment 1-6, all were identical, except the mixture of the grafted polyolefin and grafted SEBS in a mass ratio of 1:1, which replaced the polyether type thermoplastic polyurethane with a molecular weight Mw in a range of 50000 to 100000 among the used polymer auxiliaries.

Embodiment 49-54

Respectively compared with Embodiment 1-6, all were identical, except the grafted SEBS, which replaced the polyether type thermoplastic polyurethane with a molecular weight Mw in a range of 50000 to 100000 among the used polymer auxiliaries.

Embodiment 55-60

Respectively compared with Embodiment 1-6, all were identical, except the n-butane, which replaced the foaming agent.

Embodiment 61-66

Respectively compared with Embodiment 1-6, all were identical, except the n-pentane, which replaced the foaming agent.

Embodiment 67-72

Respectively compared with Embodiment 1-6, all were identical, except the n-butane, which the foaming agent.

The description of the above embodiment is intended for helping those ordinarily skilled in this field to understand and use the disclosure. Those skilled in this field can obviously easily make various changes to the above embodiment, and apply the described general principle into other embodiment without creative labor. Therefore, the disclosure is not limited to the above embodiment. All improvements and changes made by those skilled in this field on the basis of the disclosure shall fall within the protective scope of the disclosure.

What is claimed is:

1. A method for preparing a thermoplastic polyurethane elastomer material with micro air holes, comprising following steps:
    (1) feeding liquid raw materials including diisocyanate molecules and a polyol, and solid additives into a double-screw reactor to trigger a polymerization type chain extension reaction so as to obtain a hot melt having a high molecular weight;
    (2) pushing the hot melt having a high molecular weight obtained in step (1) into a mixing extruder via an exit of the double-screw reactor, and allowing the reaction to continue to generate a macromolecular thermoplastic polyurethane melt with a molecular weight distribution in a narrow range;
    (3) continuously feeding the obtained macromolecular thermoplastic polyurethane melt into a foaming extruder, and at the same time, adding a nucleator and a foaming agent into the foaming extruder, well mixing and homogenizing all materials to obtain a mixture, delivering the mixture to a mold head by a melt booster pump under a controlled pressure and at a fixed amount, and extruding a high-pressure hot melt from the mold head into an under-water granulation chamber; and
    (4) granulating the high-pressure hot melt obtained in step (3) in the underwater granulation chamber, delivering granulated particles into a separator by process water via a multi-stage pressure-release expansion process water pipeline, separating the generated expanded particles from the process water at the separator, screening and drying the expanded particles to obtain the thermoplastic polyurethane elastomer material with micro air holes.

2. The method for preparing a thermoplastic polyurethane elastomer material with micro air holes according to claim 1, wherein in step (1), the synthesized hot melt having a high molecular weight comprises the following raw materials in percentage by weight:
20-45% of the diisocyanate molecules, 45-70% of the polyol, 5-15% of n-butanediol and an allowance of the solid additives.

3. The method for preparing a thermoplastic polyurethane elastomer material with micro air holes according to claim 2, wherein the diisocyanate molecules are diphenylmethane diisocyanate, trimethylene diisocyanate, tetramethylene diisocyanate, pentamethylene diisocyanate, hexamethylene diisocyanate, heptamethylene diisocyanate, octamethylene diisocyanate, 2-methyl-1, 5-pentamethylene diisocyanate, 2-ethyl-1, 4-butanediyl diisocyanate, 1, 5-pentamethylene diisocyanate, 1, 4-butanediyl diisocyanate, 1-isocyanate-3, 3, 5-trimethyl-5-methyl isocyanate cyclohexane, 1, 4-bis (methyl isocyanate)cyclohexane, 1, 3-bis(methyl isocyanate)cyclohexane, 1, 4-cyclohexanediisocyanate, 1-methyl-2, 4-cyclohexanediisocyanate, 1-methyl-2, 6-cyclohexanediisocyanate, 2, 2'-dicyclohexylmethane diisocyanate, 2, 4'-dicyclohexylmethane diisocyanate, 4, 4'-dicyclohexylmethane diisocyanate, 2, 2'-diphenylmethane diisocyanate, 2, 4'-diphenylmethane diisocyanate, 4, 4'-diphenylmethane diisocyanate, 1, 5'-naphthalene diisocyanate, 2, 4-methylenephenyldiisocyanate, 2, 6-methylenephenyldiisocyanate, diphenylmethane diisocyanate, 3, 3'-dimethyl-biphenyl diisocyanate, 1, 2-diphenylethane diisocyanate or phenylene diisocyanate;
the polyol is polyether glycol or polyester glycol, wherein the polyether glycol is polytetramethylene ether glycol with a molecular weight in a range of 1000 to 2000, and polyester glycol is macromolecular glycol with a molecular weight in a range of 1000 to 3000 that is generated by polymerization of adipic acid and n-butanediol or by polymerization of adipic acid, n-butanediol and propanediol;
the solid additives comprise the following ingredients in percentage by weight: 0.5-2% of hindered phenol antioxidants, 0.5-2% of a hindered amine light stabilizer, and 0.05-0.5% of a mold release agent or lubricating agent.

4. The method for preparing a thermoplastic polyurethane elastomer material with micro air holes according to claim 1, wherein process conditions of the polymerization type chain extension reaction in step (1) include a heating temperature in a range of 180 to 240° C., and a screw rotation speed in a range of 100 to 1500 rpm;
and process conditions of the mixing extruder in step (2) include a screw rotation speed in a range of 100 to 300 rpm and a heating temperature in a range of 140 to 220° C.

5. The method for preparing a thermoplastic polyurethane elastomer material with micro air holes according to claim 1, wherein the mixing extruder is also provided with a regulator entrance for feeding a melt strength regulator at a tail end; and the melt strength regulator is a polyhydroxy functional group or polyisocyanate functional group polymer, added in an amount which accounts for 0.1-3% by mass of the macromolecular thermoplastic polyurethane melt obtained by the mixing extruder.

6. The method for preparing a thermoplastic polyurethane elastomer material with micro air holes according to claim 1, wherein a weight ratio of the added macromolecular thermoplastic polyurethane melt to the nucleator and the foaming agent is (70-97):(0.01-0.5):(0.1-10).

7. The method for preparing a thermoplastic polyurethane elastomer material with micro air holes according to claim 1, wherein the foaming extruder is also added with polymer auxiliaries via a front end, and a mass ratio of the added polymer auxiliaries to the macromolecular thermoplastic polyurethane melt is (0.1-30):(70-97);
the polymer auxiliaries are selected from any one or a mixture of several ones of polyurethane elastomer with a molecular weight of 30000-100000, low-melting-point polyamide, modified polyester, modified PVC, maleic anhydride-methacrylate, and grafted polyolefin;
the nucleator is selected from at least any one of carbon nano-tube, silicon dioxide, talcum powder, modified calcium carbonate, carbon black and tetrafluoroethylene powder;
and the foaming agent is selected from at least any one of $CO_2$, $N_2$, normal butane, n-pentane and isopentane.

8. The method for preparing a thermoplastic polyurethane elastomer material with micro air holes according to claim 1, wherein process conditions of the foaming extruder in step (3) include a temperature in a range of 160 to 300° C., and a screw rotation speed in a range of 50 to 900 rpm;
and the high-pressure hot melt behind the melt booster pump and in front of the mold head is under a pressure in a range of 50-220 bar.

9. The method for preparing a thermoplastic polyurethane elastomer material with micro air holes according to claim 1, wherein the process water in the underwater granulation chamber in step (4) is at a temperature in a range of 10 to 60° C. and under a pressure in a range of 4 to 15 bar.

10. The method for preparing a thermoplastic polyurethane elastomer material with micro air holes according to claim 1, wherein in step (4), the multi-stage pressure-release expansion process water pipeline is a four-stage process water pipeline, wherein a water pressure is 4-15 bar in a first-stage process water pipe, 3-12 bar in a second-stage process water pipe, 2-6 bar in a third-stage process water pipe, and 1-4 bar in a fourth-stage process water pipe.

* * * * *